United States Patent

Hames et al.

[11] Patent Number: 5,062,609
[45] Date of Patent: Nov. 5, 1991

[54] COMBINED KEYBOARD STORAGE, MONITOR SUPPORT AND DOCUMENT STORAGE SHELF APPARATUS

[75] Inventors: Edward L. Hames, Peterborough, N.H.; Robert Howitt, Leominster, Mass.

[73] Assignee: Curtis Manufacturing Company, Inc., Jaffrey, N.H.

[21] Appl. No.: 591,460

[22] Filed: Oct. 1, 1990

Related U.S. Application Data

[63] Continuation-in-part of Ser. No. 553,142, Jul. 16, 1990.

[51] Int. Cl.$^5$ .............................................. F16M 13/00
[52] U.S. Cl. ................................. 248/676; 248/176; 248/918; 400/682
[58] Field of Search .............. 248/918, 176, 639, 670, 248/675, 676; 312/348.5, 208; 400/682

[56] References Cited

U.S. PATENT DOCUMENTS

| | | | |
|---|---|---|---|
| D. 307,598 | 4/1990 | Judd et al. | |
| 2,283,690 | 5/1942 | Munson | 312/348.5 |
| 2,498,770 | 2/1950 | Sloane et al. | 312/348.5 |
| 2,778,151 | 1/1957 | Hickerson, Jr. | 312/348.5 |
| 4,863,140 | 9/1989 | Schriner | 248/639 |
| 4,901,972 | 2/1990 | Judd et al. | |

Primary Examiner—David L. Talbott
Attorney, Agent, or Firm—Richard P. Crowley

[57] ABSTRACT

A combined keyboard storage monitor support and document shelf which includes a keyboard storage apparatus for supporting a keyboard in combination with a storage shelf apparatus for supporting items in storage and for moving the supported items between a storage non-access position and an extended open position. The apparatus comprises a spaced apart pair of elements each including a support element having a side inverted U-shaped opening to store a keyboard therein, a slideable shelf, a top support shelf to support a computer monitor including short downwardly extending back and sides, a first and second channel means for engaging the tops of the support elements, a slideable storage shelf positioned directly beneath the support shelf located in a drawer cavity, the storage shelf having a plurality of elongated side rails to permit the shelf to be manually and smoothly slideable between a document stored position and an extended document acccess position.

5 Claims, 4 Drawing Sheets

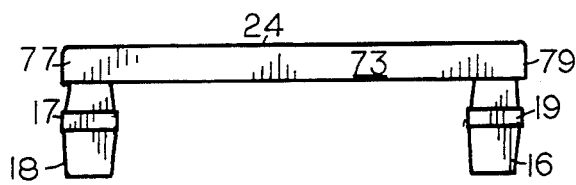
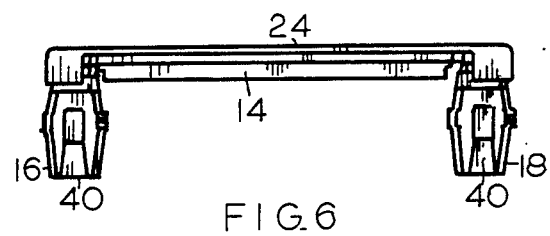
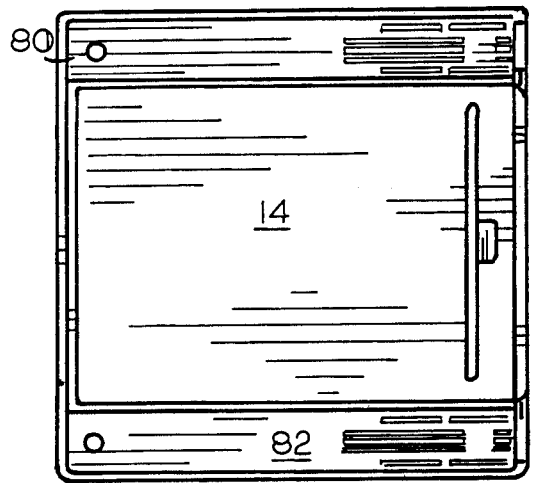
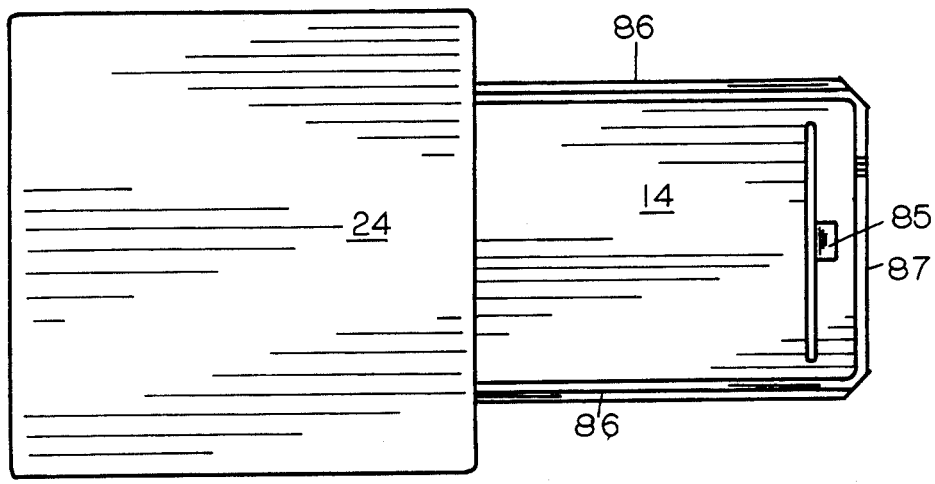
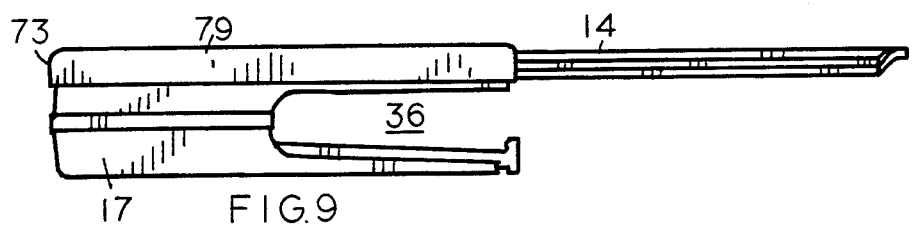

COMBINED KEYBOARD STORAGE, MONITOR SUPPORT AND DOCUMENT STORAGE SHELF APPARATUS

REFERENCE TO PRIOR APPLICATION

This application is a continuation in part of U.S. patent application Ser. No. 07/553,142 filed July 16, 1990, which is incorporated herein by reference.

BACKGROUND OF THE INVENTION

Keyboard storage devices used in connection with keyboards for use with computer monitors traditionally have been employed for supporting and for moving the supported keyboard by a slideable shelf between a storage, non-use position and an extended use position. Improved keyboard storage devices such as the keyboard storage device with a sliding keyboard shelf are disclosed for example, in U.S. Pat. No. 4,901,972 issued Feb. 20, 1990 and U.S. Pat. DES. No. 307,598 issued May 1, 1990 and are hereby incorporated herein by reference. The keyboard storage devices of the Patents have a spaced-apart pair of U-shaped support elements each having a support leg. and a slideable shelf within the support elements for the keyboard. The support elements are adapted to be screw mounted below a desk top with a computer console mounted on the desk top above, or to be mounted on top of a desk and a computer monitor placed on the top surface of the support elements. The support legs are designed to be used in pairs, in a spaced apart and parallel arrangement and typically premolded of high impact polymer, such as styrene polymer.

It is desirable to provide a new and improved compact slideable storage shelf apparatus and support which may be employed with a portable keyboard storage apparatus with support legs above the work surface and which has the advantage of use, stability and storage operation not possessed by prior art keyboard storage or devices.

SUMMARY OF THE INVENTION

The invention relates to a combined keyboard storage monitor support and document storage shelf apparatus. In particular, the invention concerns a compact keyboard storage system which may be used to store a keyboard and includes a compact, lightweight storage shelf for document storage and top support shelf for a computer monitor.

A storage apparatus has been discovered which comprises support elements including a first support leg and a second support leg positioned in spaced-apart relationship and generally parallel and each support leg having a U-shaped opening with a top surface, with an outer edge, a bottom surface, an open front and a shelf means to retain a keyboard and adapted to be slideably moved between a stored non-use position within the support legs and an extended use position in front of the legs; a top flat support shelf to support a console monitor such as a CRT computer screen monitor in communication with the keyboard having a drawer cavity; and a document storage shelf slideably positioned in the cavity directly below the top support shelf for slideable movement between a document, pencil, etc. stored position and an extended user access position.

The top support shelf is provided with a short downwardly extending back. a first side channel and a second side channel, each adapted to fit in snug relationship over the top surface of each support leg to form a support surface for a computer monitor screen, typically a horizontally oriented support surface, generally parallel to the support of the support legs, such as a table top. The document storage shelf includes a first side and a second side and a centrally disposed flat, shallow drawer for placing documents or other articles such as pencils and pens for storage. The top support shelf and drawer generally comprises lightweight rectangular construction consisting of a material such as a high impact polymer such as polystyrene.

The document storage shelf is positioned generally parallel and directly beneath in spaced relationship to the top support shelf and positioned in the drawer cavity extending along the longitudinal axis of the top support shelf, and includes a pair of longitudinally extending integral flat side rails extending transversely from the first and second side respectively of the drawer for the slideable support of the drawer on the top surface of the support legs. The first side channel and the second side channel are in spaced relationship, are generally parallel, and downwardly facing, extend longitudinally along the respective outer sides of the top support shelf and each contain a rib member positioned in parallel relationship with the downwardly extending outer edges of each channel.

The top support shelf, to support the monitor includes a computer monitor adapted for use with the keyboard, comprises in combination with the first support leg and second support leg as described in U.S. Pat. No. 4,901.972, issued Feb. 20, 1990 a rigid support surface for mounting a computer monitor wherein the tops of the first and second support legs typically extending vertically upward from a support surface, such as a table top, are adapted to fit in the downwardly facing first and second longitudinally extending side channels. The longitudinal ribs provided in the channels fit in a slot provided in the top of the support leg for securely positioning the top support shelf with respect to each of the support legs and the outer edge and back fit the back and side portions of the top of the support leg. Once the support shelf is snapped in place on top of the first and second support legs, the combined shelf and support legs apparatus is held in rigid and in secure relationship.

The slideable drawer includes a recess positioned adjacent the open end for grasping to move the drawer slideably inwardly and outwardly between the closed storage position and the outwardly extending access position.

The invention will be described for the purposes of illustration only in connection with certain embodiments; however it is recognized that those persons skilled in the art may make various changes, modifications, improvements and additions on the illustrated embodiments all without departing from the spirit and scope of the invention.

BRIEF DESCRIPTION OF THE DRAWINGS

FIG. 5 is a back elevational view of the invention of FIG. 2;

FIG. 6 is a front elevational view of the invention of FIG. 2;

FIG. 7 is a bottom plan view of the invention of FIG. 2;

FIG. 8 is a top plan view of the invention of FIG. 2 with the storage shelf in the extended position;

FIG. 9 is a side elevational view of the invention of FIG. 8;

DESCRIPTION OF THE EMBODIMENTS

Figure 1:
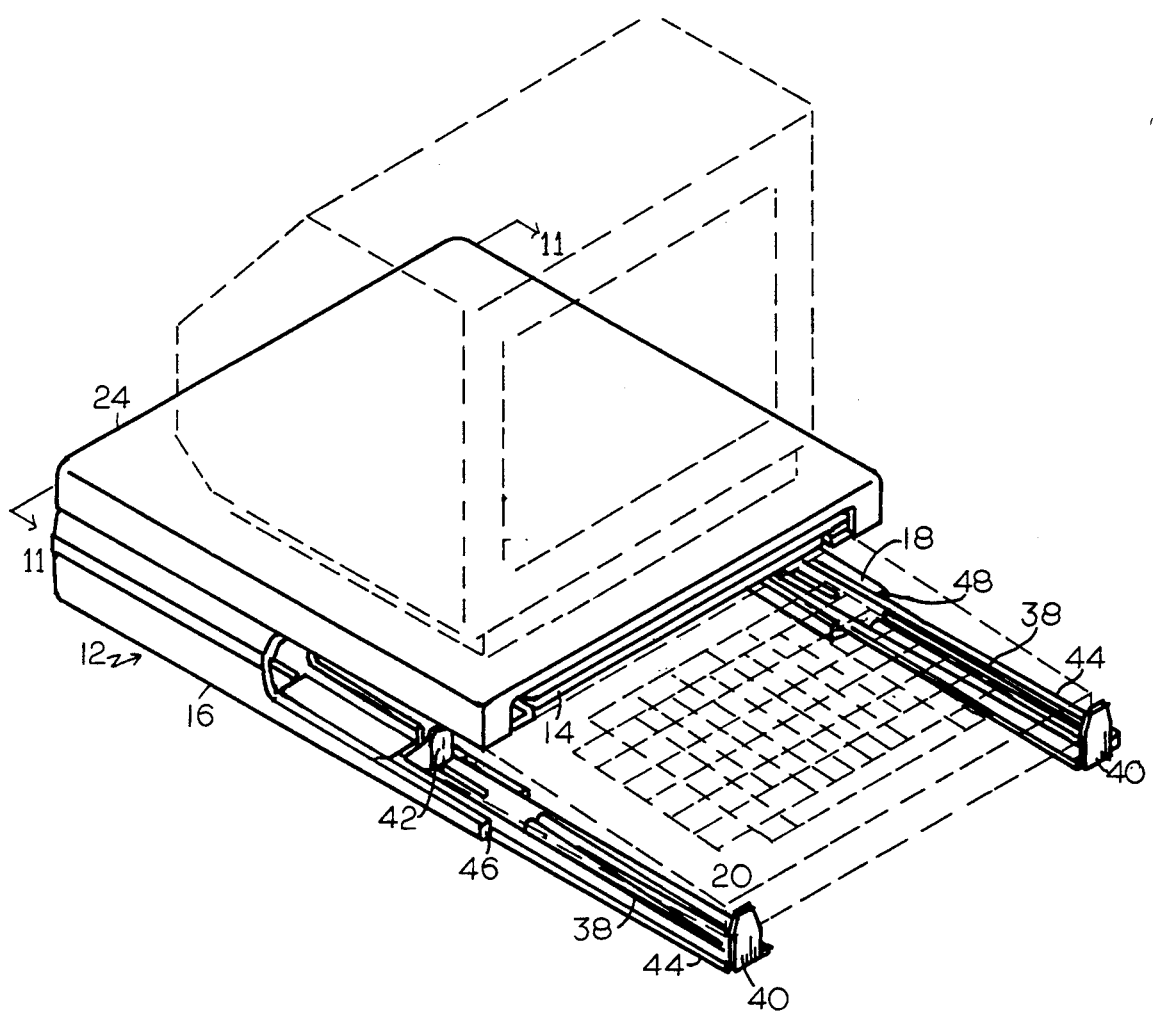
FIG. 1 is a perspective view from above of the combined keyboard storage, monitor support and document storage shelf apparatus and system of the invention, the keyboard and the monitor shown in dotted lines with the keyboard shown in an extended use position.
Figure 2:
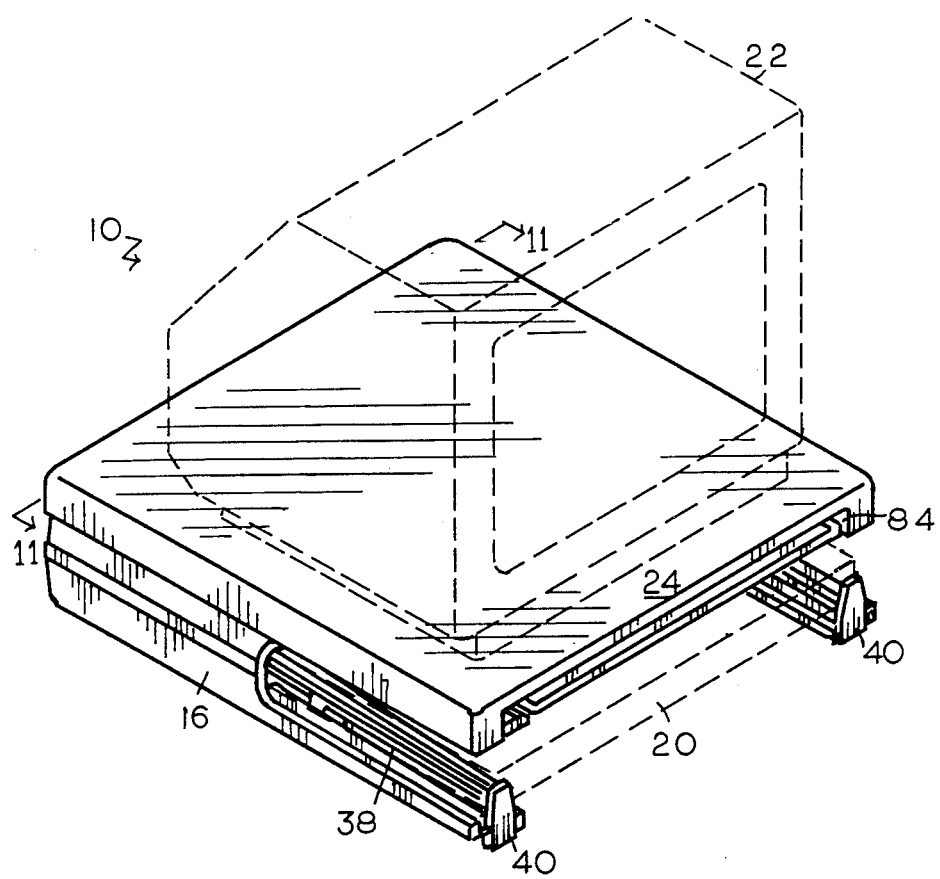
FIG. 2 is a perspective view from above of the invention of FIG. 1 with the keyboard in a non-extended storage position.

FIGS. 1 and 2 show a keyboard storage system 10 comprising a keyboard storage monitor support apparatus 12 and a document storage shelf 14 wherein the keyboard storage monitor support 12 comprises two parallel spaced-apart support legs 16 and 18 for the storage of a computer keyboard 20 shown in dotted outline form in a stored non-use position in FIG. 2 and in an extended use position in FIG. 1, and showing the support of a computer console also shown in dotted outline form.

Figure 3:
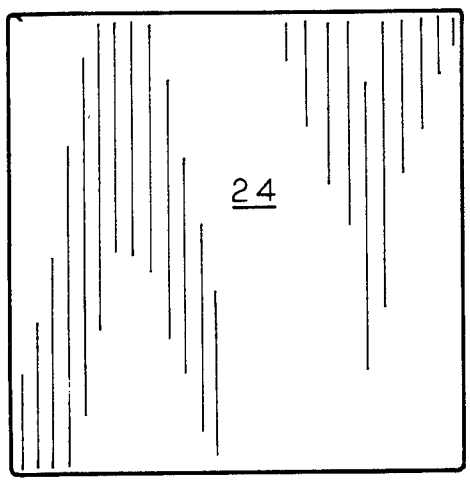
FIG. 3 is a top plan view of the invention of FIG. 2.
Figure 4:
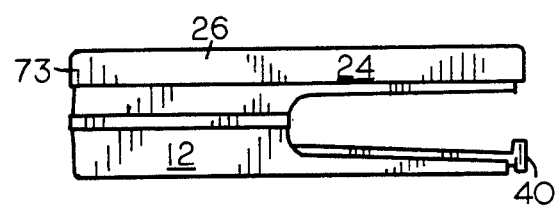
FIG. 4 is a side elevational view of the invention of FIG. 2, the other side being the same.

FIGS. 4 & 5 show the two support legs 16 and 18 in an upright generally parallel, spaced-apart relationship supporting a generally flat top support shelf 24 as shown in FIG. 3 for mounting the computer console 22 and containing the document storage shelf 14. The support legs 16 and 18 each have a top surface 21 of elongated generally rectangular shape, a back surface 23 and an outer surface 25.

FIGS. 4, 5, 6 and 9 show in greater detail the support legs 16 or 18 each composed of two molded, fitted, hollow, plastic elements 17 and 19 to form the side inverted U-shaped space in the opening 36. The slideable keyboard storage shelf 38 has an integral molded fixed, upright retention element 40 at a free end to retain the keyboard 20. The shelf 38 includes a slideably adjustable keyboard upright and clamping element 42 shown in FIG. 1 adjustable to meet the depth of the keyboard 20 to be stored, the shelf 38 being designed to extend about the length of the keyboard 20 being supported and for easy slideable movement on the lower inner surface of the storage apparatus between the keyboard non-use and use positions. The shelf 38 includes outwardly extending side ribs 44 which matingly fit into channel members 46 & 48 on the molded elements 17 to permit slideable movement of the shelf 38. If desired, other means can be used to permit slideable movement.

FIGS. 7 and 8 show the bottom and top of the document storage shelf 14, wherein in FIG. 7, the document storage shelf 14 includes a drawer 75 in the closed position and in FIG. 8 the drawer 75 is in the open user access position.

Figure 10:
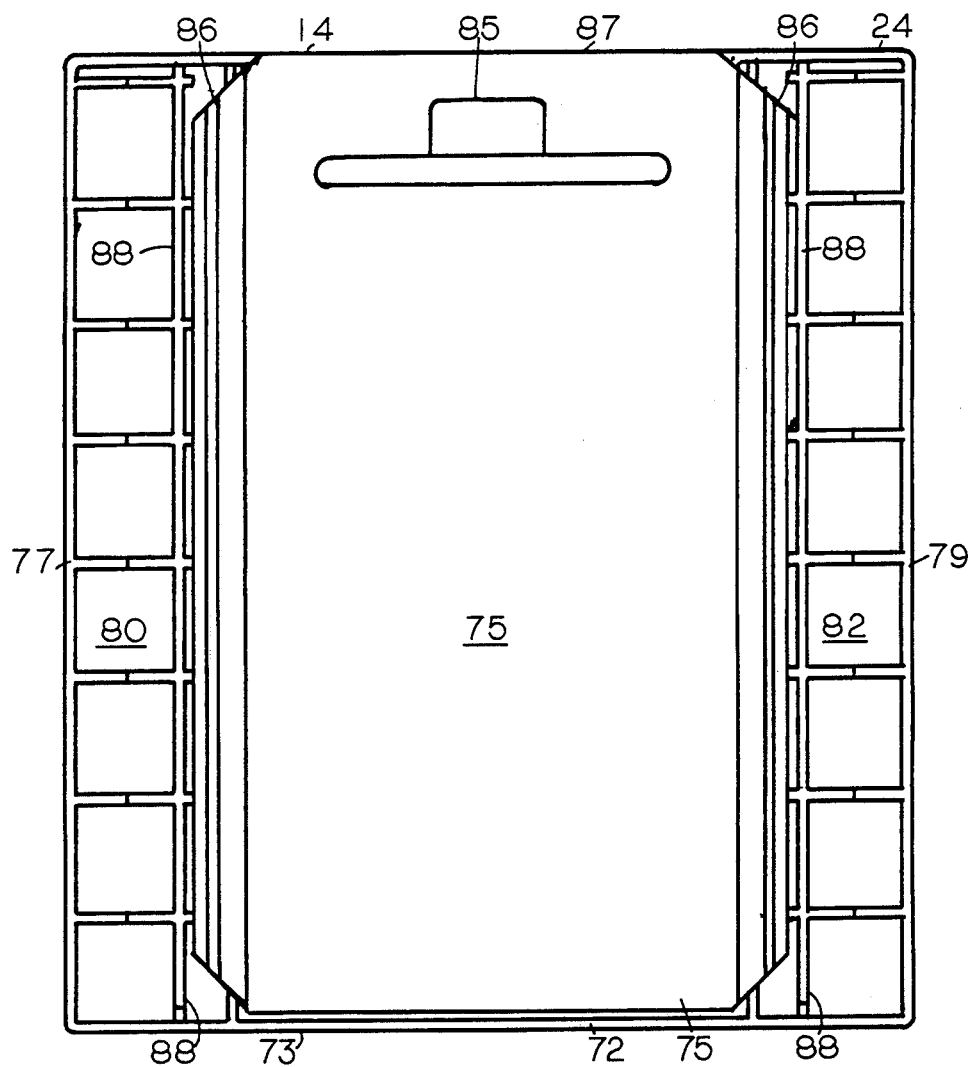
FIG. 10 is a bottom plan view of the storage shelf of the invention of FIG. 2.
Figure 11:
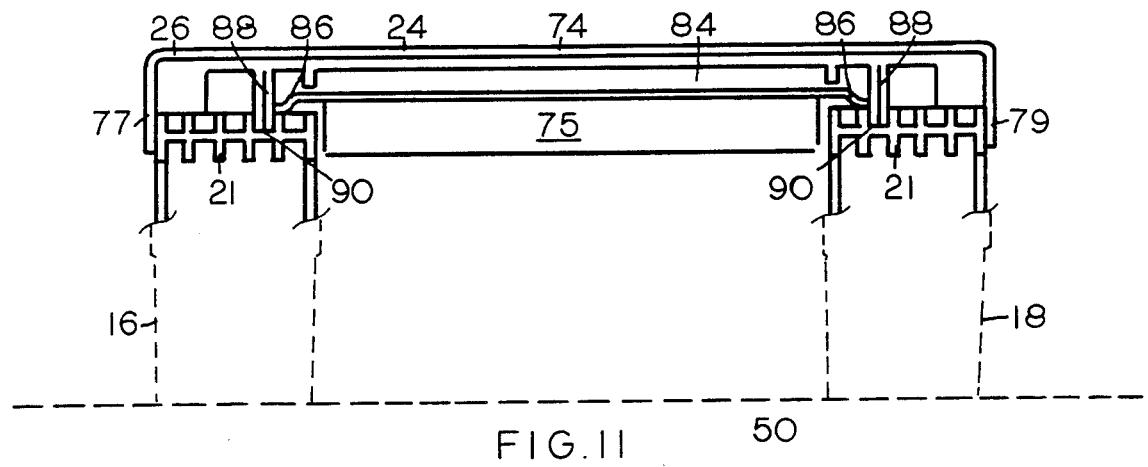
FIG. 11 is a partial sectional view of the invention of FIG. 2 shown along lines 11—11 in FIG. 2.

FIGS. 10 and 11 show the use of the spaced-apart support legs 16 and 18, the slideable storage shelf 14 and the top support shelf 24 each typically constructed of thin walled molded plastic such as polystyrene. The top support shelf 24, typically constructed in one piece, includes a top surface 26, generally flat in parallel relationship with the top of a supporting surface such as a work table 50 shown in dotted lines in FIG. 11; a short downwardly extending back 73, shown in FIG. 9; downwardly extending sides 77 and 79 and a first side channel member 80 and a second side channel member 82 extending longitudinally along the arms of the shelf adjacent the sides 77 and 79. The side channel members are adapted to receive the top multi-grooved surface 21 of each of the support legs 16 and 18 for positioning the legs in fixed spaced-apart parallel relationship. The top surface 26 of the top support shelf 24 is constructed to support a computer monitor 22 shown on dotted lines in FIG. 2 and a drawer cavity 84 is provided in downwardly spaced relationship and generally parallel to the top support shelf 24.

The document storage shelf 14 also shown in FIG. 11 is slideably positioned in the drawer cavity 84 containing a shallow drawer 75, generally horizontally positioned and disposed intermediate a pair of outwardly extending elongated rails 86 and 88 for slideable movement between an extended user access position extending outwardly positioned in front of the support legs 16 and 18 and as shown in FIGS. 8 and 9 and a stored position directly beneath the top surface 26 within cavity 84 shown in FIGS. 7 and 2. If desired, other means can be used to permit slideable movement.

The document storage shelf 14 as shown in FIG. 11 also includes a molded handle 85 adjacent the outer end 87 of the drawer 75. The side channel members 80 and 82 each comprise a longitudinal rib 88 generally parallel to the downwardly extending sides 77 and 79, each rib 88 adapted to cooperate with a mounting groove 90 provided in the multi-grooved top surfaces 21 of each of the support legs 16 and 18, wherein with the top support shelf 24 snapped in place on the top surfaces 21 of molded elements 19 of the spaced apart support legs 16 and 18, the back 73 and sides 74 cooperatively engage the outer surfaces 25 and back surface 23 of the support legs 16 and 18 for a secure fit, holding the support legs in fixed relationship.

What is claimed is:

1. A combined keyboard storage, monitor support and document storage shelf apparatus, which apparatus comprises:
    a) a first support leg and a second support leg positioned in a generally parallel, spaced apart relationship, each having a U-shaped opening with a top and back surface, with an other side and a bottom surface an open front to define an open space;
    b) means on the bottom surface of each support leg to retain a keyboard and to permit slideable movement of the keyboard between a stored, non-use position within the open space defined by the support legs and an extended, use position in front of the support legs;
    c) a top flat support shelf to form a support surface for a monitor screen console characterized by a central drawing cavity disposed between a first and second side channel member comprising:
        i) a short downwardly extending back; and
        ii) the first side channel member in spaced relationship with the second side channel member for fitting in snug relationship over the top surface of the support legs to form a support surface for the monitor screen console, the first side channel member comprising a first downwardly extending side and the second side channel member comprising a second downwardly extending side and each side member characterized by a side rail cavity extending along the axis of the channel member and parallel to the top support shelf in spaced relationship therewith; and d) a slideable, generally shallow document storage shelf means positioned directly beneath the support shelf and slideably positioned in the drawer cavity and slideably movable between a stored position directly beneath the support shelf and an extended user across position extending outwardly in front of the support leg comprising:
  i) a drawer for supporting items for storage having a first and second side; and
  ii) a plurality of spaced apart elongated side rail means extending outwardly from the sides of the drawer for resting on the top surfaces of the support legs to permit the drawer to be mutually slideably moved between a document storage position and an extended document access position.

2. The keyboard storage apparatus of claim 1 wherein the first and second support legs have slots extending on the top surfaces and the top support shelf includes a first longitudinally extending rib and a second longitudinally extending rib adapted to fit into the slots provided in the top surfaces of the first and second support legs, the ribs extending longitudinally within the first and second side channels in fixed relationship with the first downwardly extending side and the second downwardly extending side for holding the first and second support legs in fixed spaced-apart relationship.

3. The keyboard storage apparatus of claim 1 wherein the top support shelf includes downwardly extending back and sides adapted to engage cooperatively the back surface and sides of the first and second support legs to hold the support legs in a fixed relationship.

4. A keyboard storage and document storage system which comprises the apparatus of claim 1 and which includes a keyboard mounted on the means to retain the keyboard.

5. The system of claim 4 which includes a computer having a monitor screen console adapted for use with the keyboard and supported on the top surface of the support shelf.

* * * * *